United States Patent
Bac

(10) Patent No.: US 6,877,364 B2
(45) Date of Patent: Apr. 12, 2005

(54) DIGITAL SWING WEIGHT SCALE

(75) Inventor: Mitchell E. Bac, Glendale, AZ (US)

(73) Assignee: Karsten Manufacturing Corp., Phoenix, AZ (US)

( * ) Notice: Subject to any disclaimer, the term of this patent is extended or adjusted under 35 U.S.C. 154(b) by 0 days.

(21) Appl. No.: 10/346,775

(22) Filed: Jan. 17, 2003

(65) Prior Publication Data
US 2004/0139793 A1 Jul. 22, 2004

(51) Int. Cl.[7] .................. G01M 1/00; A63B 53/00; G01G 23/30
(52) U.S. Cl. ................ 73/65.03; 177/171; 73/65.01
(58) Field of Search .................... 73/65.01, 65.03, 73/862.08; 177/171

(56) References Cited

U.S. PATENT DOCUMENTS

| | | | |
|---|---|---|---|
| 2,595,717 A | * | 5/1952 | Smith .................. 73/65.03 |
| 3,371,523 A | | 3/1968 | Crouch et al. |
| 3,577,771 A | | 5/1971 | Solheim |
| 5,727,399 A | * | 3/1998 | Bergagnini ............ 63/15.4 |
| 6,363,620 B1 | * | 4/2002 | Goodjohn .............. 33/508 |

* cited by examiner

Primary Examiner—Edward Lefkowitz
Assistant Examiner—Lilybett Martir
(74) Attorney, Agent, or Firm—Darrell Marquette

(57) ABSTRACT

A swing weight scale is presented that measures the swing weight of a golf club by measuring the torque exerted by the club about fixed balance point. The apparatus comprises an elongated torque arm pivotally mounted to a base. At one end of the torque arm a pair of rollers cradle the shaft of the golf club from underneath. At the other end of the torque arm a vertical stop provides a reference for locating the butt of the golf club shaft and provides the mounting surface for a second pair of rollers that cradle the upper surface of the shaft at the butt end. The rollers allow the golf club shaft to freely rotate about its longitudinal axis so that the golf club head will hang down freely. A torque sensor is mounted at the pivot point of the torque arm to measure the torque produced by the golf club as it is supported by the torque arm. A simple computer program converts the torque produced by the golf club on the torque arm into swing weights based on the known dimensions, weight and other parameters of the apparatus.

6 Claims, 2 Drawing Sheets

DIGITAL SWING WEIGHT SCALE

BACKGROUND OF THE INVENTION

This invention relates broadly to the field of sports and more specifically to apparatus for measuring the swing weight of a golf club.

It is generally considered to be desirable to know the swing weight of a golf club in order to fit a set of clubs to an individual's needs. Swing weights were, at one time, measured in ounces up to as much as 28 ounces, or more. Today, they are most commonly measured on an arbitrary alphabetical scale from A to G. A swing weight of B is generally recommended for junior golfers. Swing weights from C to D are generally recommended for lady golfers. Swing weights from D to G are recommended for men. Within each alphabetical scale there are ten graduations generally denoted as subscripts (e.g., $A_{1-10}$, $B_{1-10}$, etc.), providing a total of 70 standard swing weights ranging from $A_1$ to $G_{10}$ Swing weights categorized within the first five graduations of the C swing weight, $C_{1-5}$ are considered light to medium for ladies, while the last five graduations, $A_{6-10}$ are considered medium to heavy. Similarly, for men, the first four graduations of the D swing weight are considered light to medium and the next four, medium to moderately heavy. Swing weights above $D_8$ and on through the G classification are considered moderately heavy to extra heavy.

It is desirable to be able to quickly measure the swing weight of clubs in order to ascertain whether the set is properly matched and, in production, to determine whether clubs are being produced to the appropriate swing weight. Swing weight balances presently available are similar to that disclosed in U.S. Pat. No. 2,595,717 to Smith. These swing weight balances employ a balance arm supported on a fulcrum comprising a forked upright member having each branch terminated with a V-slot. A heavy base supports the fork, and a transverse member fixed to the balance arm holds the balance arm in the V-slots. For sensitivity, the transverse arm is provided with a knife-edge fitting into the V-slots of the fork. The club grip is secured to one end of the arm remote from the fulcrum, while the club shaft is allowed to rest on the other end of the arm opposite the fulcrum. A balance weight is them moved along the arm until a balance is achieved. The swing weight of the club is then read directly from the arm based on the position of the balance weight. In order to maintain the arm in a substantially horizontal position against the inevitable oscillatory motion as the weight is moved up and down the arm, appropriate limit stops are provided above and below the grip end of the balance arm.

Another available apparatus for measuring the swing weight of the golf club is disclosed in U.S. Pat. No. 3,577,771 to Solheim. The apparatus disclosed therein comprises an elongated rigid member having a first upright section at one end to support a golf club shaft; a second upright section at the other end to hold the grip end of the club; and a two longitudinally displaced rockers that support the apparatus on a tabletop surface. The rockers function as fulcrums to provide an indication when the apparatus is balanced. The position of the balance weight is adjusted along the rigid member to balance the rigid member on one rocker with a golf club held by the upright sections with a shaft supported by the first upright section and extending away from the second upright section.

Both of the aforementioned swing weight balances require an operator to manually move a balance weight in order to measure the swing weight of the club. Consequently, use of these apparatus can be slow and somewhat tedious. What is needed, then, is a swing weight scale that measures swing weight directly without the need to manually move a balance weight.

SUMMARY OF THE INVENTION

The present invention comprises a swing weight scale that measures swing weight directly using a torque transducer that measures the torque produced by clubs of different swing weight about a balance fixture. In one embodiment, the apparatus comprises an elongated torque arm pivotally mounted to a base. At one end of the torque arm a pair of rollers cradle the shaft of the golf club from underneath. At the other end of the torque arm a vertical stop provides a reference for locating the butt of the golf club shaft and provides the mounting surface for a second pair of rollers that cradle the upper surface of the shaft at the butt end. The rollers allow the golf club shaft to freely rotate about its longitudinal axis so that the golf club head will hang down freely to assume its lowest energy position. A torque sensor is mounted at the pivot point of the torque arm to measure the torque produced by the golf club as it is supported by the torque arm. A simple computer program converts the torque produced by the golf club on the torque arm into a swing weight based on the known dimensions, weight and other parameters of the apparatus.

BRIEF DESCRIPTION OF THE DRAWING

The present invention will be better understood from a reading of the following detailed description, taken into conjunction with the accompanying drawings figrues in which like references designate like elements and, in which.

DETAILED DESCRIPTION

Figure 1:
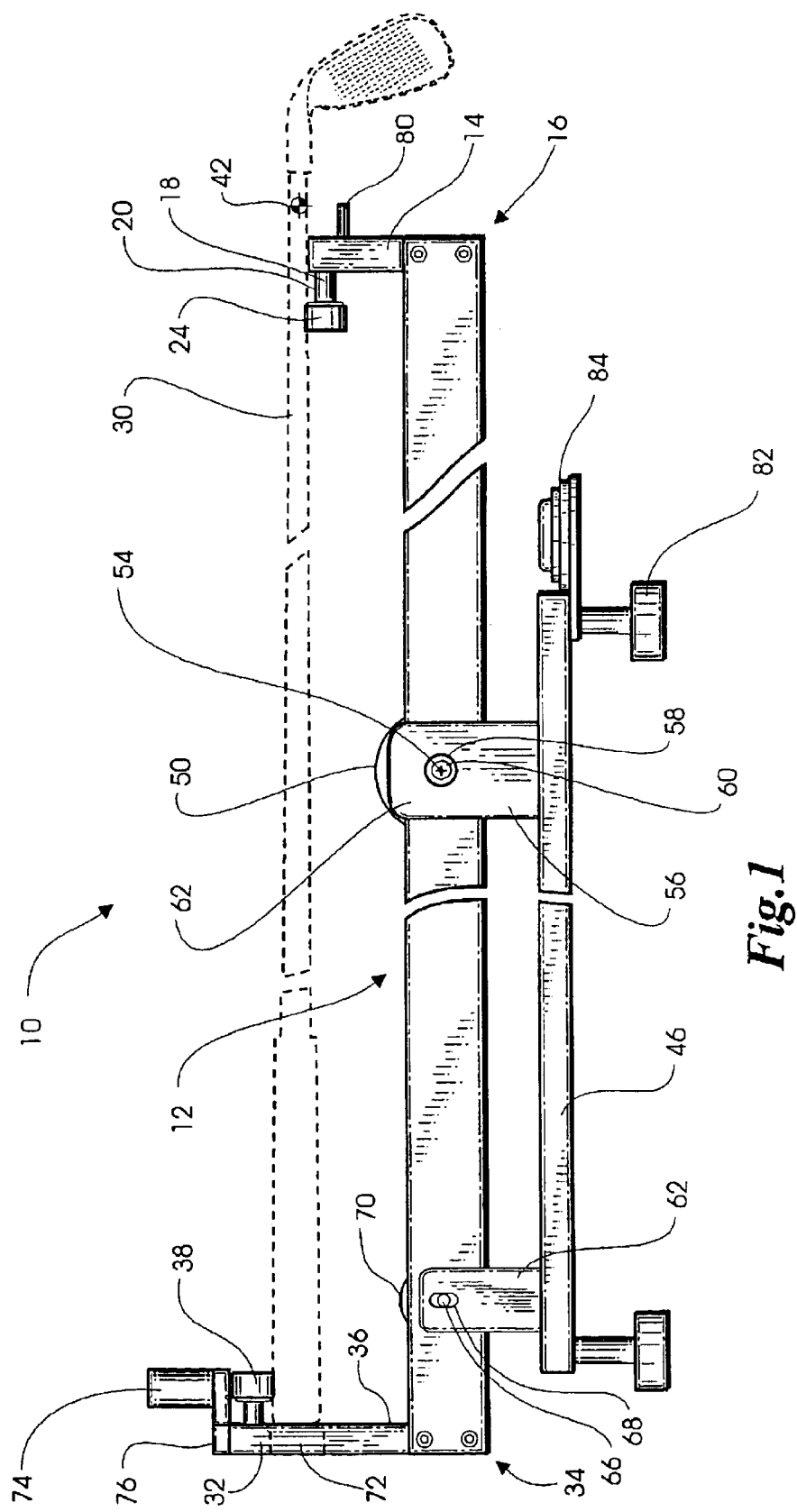
FIG. 1 is a side elevational view of a swing weight scale incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and the detailed description are not intended to limit the invention to the particular form disclosed but are merely illustrative and intended to teach one of ordinary skill how to make and/or use the invention claimed herein and for setting forth the best mode for carrying out the invention.

With reference to the figures, swing weight scale 10 comprises an elongated rigid torque arm 12 having an upright section 14 at end 16 thereof. A pair of shafts 18, 20 extend horizontally inwardly from upright section 14. Mounted to shafts 18 and 20 are rollers 22 and 24 which are adapted to present a surface for cradling a golf club shaft 30. A second upright section 32 extends upwardly from the opposite end 34 of torque arm 12. The horizontally facing surface 36 of second upright section 32 acts as a stop for positioning the butt end of golf club shaft 30 atop torque arm 12. A pair of rollers 38 and 40 are supported by shafts that extend horizontally inwardly from second upright section 32 to form a ledge that provides a downward facing surface to cradle the upper surface of shaft 30 proximal the butt end of the shaft, thereby holding the shaft in place atop torque arm 12.

Figure 2:
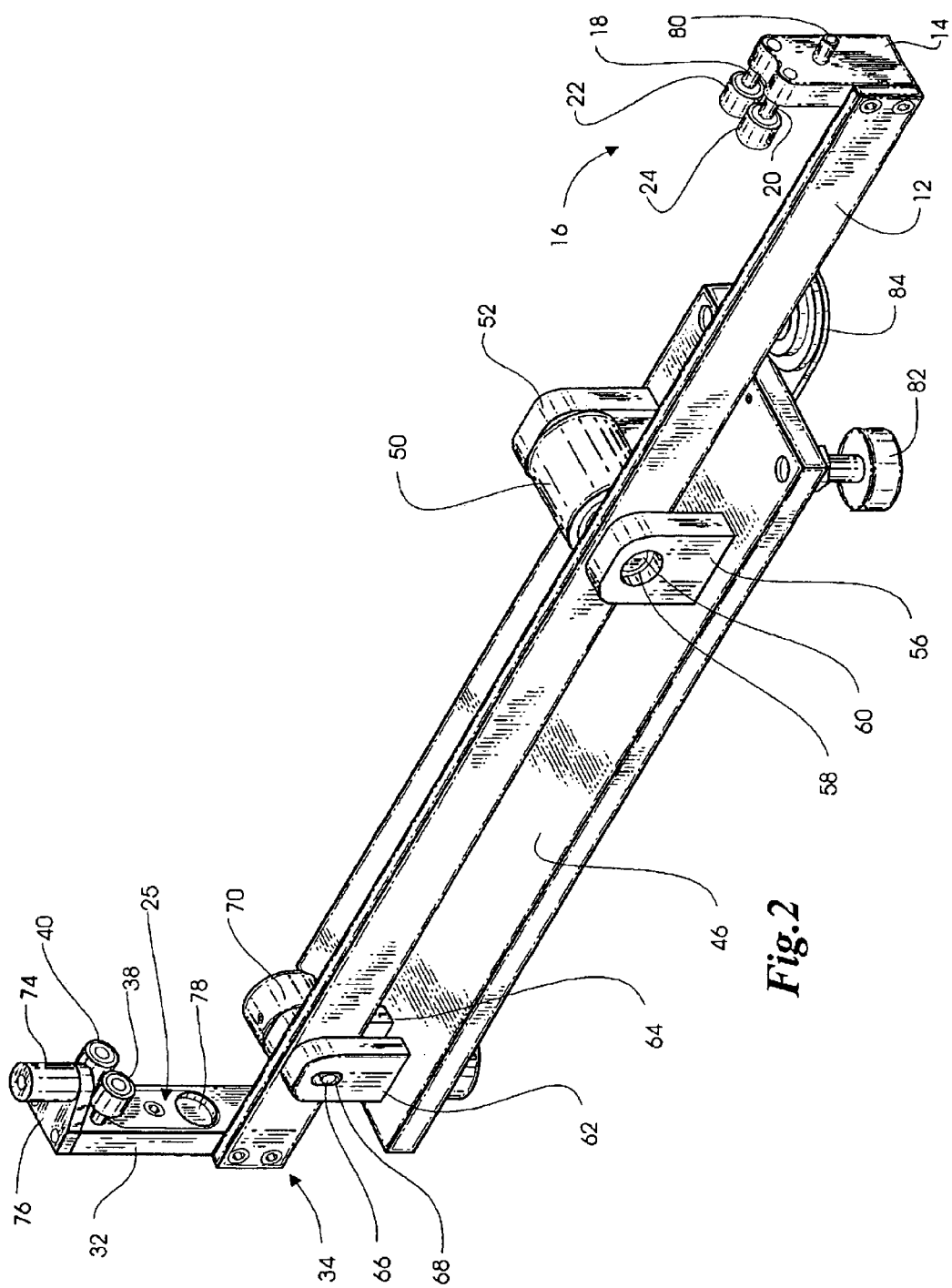
FIG. 2 is a perspective view of a swing weight scale incorporating features of the present invention.

The length of torque arm 12 is chosen so that the center of gravity 42 of the golf club is beyond rollers 22 and 24 at end 16 of torque arm 12. This is so that shaft 30 exerts a downward normal force at rollers 22 and 24 and an upward normal force at rollers 38 and 40. This permits the club to be easily and repeatedly positioned in apparatus 10. In the embodiment of FIGS. 1 and 2, the length of torque arm 12 is approximately 23 inches.

Torque arm 12 is pivotally mounted to a base 46 by means of a torque transducer 50. Torque transducer 50 is attached at one end to a mounting block 52 and at the other end to the pivot point 54 of torque arm 12 located approximately $3/5^{th}$ of the way along torque arm 12. The exact position of pivot point 54 is determined based on the weight of the components making up the moving parts of swing weight scale 10 as discussed more fully hereinafter. Torque transducer 50 may be any conventional reaction torque sensor but in the embodiment disclosed herein torque sensor comprises an RTS-200 reaction torque sensor manufactured by Transducer Techniques of Temecula, Calif. The RTS-200 torque sensor has a rated capacity of ±/−100 inch ounces and a tortional stiffness of 14,525 inch ounces per radian.

Since most torque sensors are bi-directional, to increase the sensitivity of swing weight scale 10, the location of pivot point 54 is chosen so that the empty fixture produces a counterclockwise torque (as viewed in FIG. 1) approaching the full scale deflection of the torque transducer 50 in one direction and the heaviest swing weight club ($F_{10}$) approaches the full scale deflection of torque transducer 50 in the opposite direction. This way, a torque transducer of maximum sensitivity can be chosen for the application. A simple computer program converts the torque measurement into a swing weight reading.

In order to prevent damage to the relatively delicate torque transducer, swing weight scale 10 is equipped with a number of overtravel limit stops. To prevent an excessive cantilever load from deforming the input shaft of torque transducer 50, a pillow block 56 supporting a bearing 58 is mounted such that the input shaft 60 of torque transducer 50 passes therethrough. Shaft 60 does not ride in bearing 58 but instead there is a diameteral clearance of approximately 0.004 inch between shaft 60 and bearing 58 such that shaft 60 does not touch bearing 58 unless shaft 60 is in danger of being overloaded. This arrangement minimizes possible measurement errors induced by friction between shaft 60 and bearing 58 while providing the necessary ruggedness. Additional support against lateral bending of torque arm 12 is provided by a pair of vertical guides 62 and 64 comprising a pair of vertical flanges mounted on opposite sides of torque arm 12 with a clearance of approximately 0.015 inches. A rotational limit stop is also provided to prevent overtorquing of torque transducer 50. The rotational limit stop comprises a pin 66 pressed into a hole through torque arm 12. Pin 66 rides in a groove 68 formed in vertical guide 62 and a corresponding groove (not shown) formed in vertical guide 64. The length of the grooves provides the desired travel limits. Pin 66 may also support a counterweight 70 used to fine tune the reverse bias of torque arm 12 in the unloaded condition as discussed hereinbefore.

In order to allow for measurement of swing weight of a golf club without a grip installed, a hole or aperture 72 is formed in second upright section 32 to allow shaft 30 to extend a predetermined amount therethrough. A second removable counterweight 74 may be placed over a pin extending upward from flange 76 to simulate the weight of the missing grip. To make the swing weight scale 10 easily converted from gripless to gripped shafts, a cover plate 26 is provided that fits into a recess in second upright section 32 and is retained by a conventional countersunk screw or similar means. Cover plate 26 is reversible such that the aperture 78 formed in cover plate 26 may be aligned with hole 72 such that hole 72 is uncovered to permit a shaft to pass therethrough. Alternatively, cover plate 26 may be installed such that the solid end of cover plate 26 is aligned with hole 72 to prevent the butt end of the shaft from passing through hole 72.

For calibration purposes, a horizontal pin 80 extends horizontally and outward from upright section 14 to provide a hanger for a calibration weight (not shown). Base 46 is provided with legs 82 which may be adjustable to permit base 46 to be leveled on any surface a conventional bubble level 84 may be conveniently attached to base 46 for this purpose.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principals of applicable law.

What is claimed is:

1. Apparatus for measuring the swing weight of a golf club having a shaft with a butt end, said apparatus comprising:

a base;

an elongate member pivotally mounted to said base, said elongate member being made of a rigid material having a longitudinal axis, a first end and a second end, said elongate member further having a first upright section at said first end, said first upright section presenting a first support surface for supporting the shaft of said golf club resting on said first upright section, and a second upright section at said second end, said second upright section functioning as a positioning stop for the butt end of said shaft resting on said first upright section, said second end further including a horizontally extending ledge extending toward said first end, said horizontally extending ledge presenting a second support surface for limiting the upward travel of the butt end of said shaft relative to said second upright section;

a torque transducer having a sensing axis that is substantially transverse to the longitudinal axis of said elongate member, said torque transducer being mounted to said base and attached to said elongate member medial of said first and second ends for sensing a transverse torque applied to said elongate member by said golf club resting on said elongate member; and a rotational limit stop comprising a horizontal pin fixed to said elongate member proximal one of said first and second ends disposed in a vertical slot fixed to said base.

2. Apparatus for measuring the swing weight of a golf club having a shaft with a butt end, said apparatus comprising:

a base;

an elongate member pivotally mounted to said base, said elongate member being made of a rigid material having a longitudinal axis, a first end and a second end, said elongate member further having a first upright section at said first end, said first upright section presenting a first support surface for supporting the shaft of said golf club resting on said first upright section, and a second upright section at said second end, said second upright section functioning as a positioning stop for the butt end of said shaft resting on said first upright section, said second end further including a horizontally extending ledge extending toward said first end, said horizontally extending ledge presenting a second support surface for limiting the upward travel of the butt end of said shaft relative to said second upright section; and a torque transducer having a sensing axis that is substantially transverse to the longitudinal axis of said elongate member, said torque transducer being mounted to said base and attached to said elongate member medial of said first and second ends for sensing a transverse torque applied to said elongate member by said golf club resting on said elongate member, said torque transducer comprising a cantilevered shaft supporting said elongate member, wherein said cantilevered shaft extends through said elongate member and passes through a pillow block with a predetermined clearance, whereby said pillow block forms a vertical overload limit stop to prevent said cantilevered shaft from being deflected beyond a predetermined limit.

3. Apparatus for measuring the swing weight of a golf club having a shaft with a butt end, said apparatus comprising:

a base;

an elongate member pivotally mounted to said base, said elongate member being made of a rigid material having a longitudinal axis, a first end and a second end, said elongate member further having a first upright section at said first end, said first upright section presenting a first support surface for supporting the shaft of said golf club resting on said first upright section, and a second upright section at said second end, said second upright section functioning as a positioning stop for the butt end of said shaft resting on said first upright section, said second end further including a horizontally extending ledge extending toward said first end, said horizontally extending ledge presenting a second support surface for limiting the upward travel of the butt end of said shaft relative to said second upright section;

a torque transducer having a sensing axis that is substantially transverse to the longitudinal axis of said elongate member, said torque transducer being mounted to said base and attached to said elongate member medial of said first and second ends for sensing a transverse torque applied to said elongate member by said golf club resting on said elongate member;

an aperture formed in said second upright section sized to permit a shaft without a grip installed to pass through said second upright section; and a cover plate having a solid end and a holed end, said holed end having an aperture corresponding to the aperture formed in said second upright section, said cover plate capable of being mounting to said second upright in a first position in which said solid end covers the aperture formed in said second upright section and a second position in which said holed end reveals the aperture formed in said second upright section.

4. Apparatus for measuring the swing weight of a golf club having a shaft with a butt end, said apparatus comprising:

a base;

a rigid elongate member having a longitudinal axis, a first end and a second end, said rigid elongate member being pivotally mounted to said base about a horizontal transverse axis medial of said first and second ends, said rigid elongate member presenting an upward facing first support surface proximal said first end, a horizontally facing stop surface proximal said second end, and a second supporting surface presenting a downward facing second support surface proximal said second end, said first support surface, said second support surface and said stop surface cooperating to support the shaft of said golf club in a predetermined position for measurement of the swing weight of said golf club with the butt end of said shaft resting against said stop surface, a lower surface of said shaft resting on said first support surface and an upper surface of said shaft pressing against said second support surface;

a torque transducer operably attached to said rigid elongate member for measuring a torque about said horizontal transverse axis; and a rotational limit stop comprising a horizontal pin fixed to said elongate member proximal one of said first and second ends disposed in a vertical slot fixed to said base.

5. Apparatus for measuring the swing weight of a golf club having a shaft with a butt end, said apparatus comprising:

a base;

a rigid elongate member having a longitudinal axis, a first end and a second end, said rigid elongate member being pivotally mounted to said base about a horizontal transverse axis medial of said first and second ends, said rigid elongate member presenting an upward facing first support surface proximal said first end, a horizontally facing stop surface proximal said second end, and a second supporting surface presenting a downward facing second support surface proximal said second end, said first support surface, said second support surface and said stop surface cooperating to support the shaft of said golf club in a predetermined position for measurement of the swing weight of said golf club with the butt end of said shaft resting against said stop surface, a lower surface of said shaft resting on said first support surface and an upper surface of said shaft pressing against said second support surface;

a torque transducer operably attached to said rigid elongate member for measuring a torque about said horizontal transverse axis, said torque transducer comprising a cantilevered shaft supporting said elongate member, wherein said cantilevered shaft extends through said elongate member and passes through a pillow block with a predetermined clearance, whereby said pillow block forms a vertical overload limit stop to prevent said cantilevered shaft from being deflected beyond a predetermined limit.

6. Apparatus for measuring the swing weight of a golf club having a shaft with a butt end, said apparatus comprising:

a base;

a rigid elongate member having a longitudinal axis, a first end and a second end, said rigid elongate member being pivotally mounted to said base about a horizontal transverse axis medial of said first and second ends, said rigid elongate member presenting an upward facing first support surface proximal said first end, a horizontally facing stop surface proximal said second end, and a second supporting surface presenting a downward facing second support surface proximal said second end, said first support surface, said second support surface and said stop surface cooperating to support the shaft of said golf club in a predetermined position for measurement of the swing weight of said golf club with the butt end of said shaft resting against said stop surface, a lower surface of said shaft resting on said first support surface and an upper surface of said shaft pressing against said second support surface; and a torque transducer operably attached to said rigid elongate member for measuring a torque about said horizontal transverse axis;

wherein said horizontally facing stop surface has formed therein an aperture sized to permit a shaft without a grip installed to pass through, said apparatus further including a cover plate having a solid end and a holed end, said holed end having an aperture corresponding to the aperture formed in said horizontally facing stop surface, said cover plate capable of being mounted to said horizontally facing stop surface in a first position in which said solid end covers the aperture formed in said horizontally facing stop surface and a second position in which said holed end reveals the aperture formed in said horizontally facing stop surface.

* * * * *